United States Patent [19]
Widmer et al.

[11] Patent Number: 4,549,000
[45] Date of Patent: Oct. 22, 1985

[54] THERMOSETTING POWDER LACQUER FOR COVERING WELD SEAMS

[75] Inventors: Hans R. Widmer, Hombrechtikon; Christian Schmid, Meilen, both of Switzerland

[73] Assignee: Vernicolor AG, Grüningen, Switzerland

[21] Appl. No.: 586,330

[22] Filed: Mar. 5, 1984

[30] Foreign Application Priority Data

Mar. 9, 1983 [CH] Switzerland ............... 1264/83

[51] Int. Cl.$^4$ ............................................. C08G 59/38
[52] U.S. Cl. ........................... 525/482; 525/438; 528/98; 528/103
[58] Field of Search ........... 525/482, 438; 528/98, 528/103

[56] References Cited

U.S. PATENT DOCUMENTS 3,367,990 2/1968 Bremmer ..................... 525/482
3,932,343 1/1976 Barie ........................... 525/482 X
4,169,187 9/1979 Glazar ........................ 525/482 X
4,440,914 4/1984 Helfand et al. ............. 525/482

FOREIGN PATENT DOCUMENTS 2130607 6/1970 Fed. Rep. of Germany .
2055843 7/1979 United Kingdom .

Primary Examiner—Earl Nielsen
Attorney, Agent, or Firm—Werner W. Kleeman

[57] ABSTRACT

The thermosetting powder lacquer is suited for covering the weld seams in metal containers for foodstuffs or beverages and comprises a mixture of at least two aromatic epoxide resins, a first component of which contains a maximum of two epoxide groups per molecule on the average and a second component of which contains more than two epoxide groups per molecule on the average, a hardener and a catalyst. As a hardener there is used a condensation product formed from the diglycidylether of bisphenol-A and bisphenol-A and as a catalyst dimethylaminophenol is used.

17 Claims, No Drawings

THERMOSETTING POWDER LACQUER FOR COVERING WELD SEAMS

BACKGROUND OF THE INVENTION

The present invention relates to a new and improved thermosetting powder lacquer on an epoxide resin basis and a method of using such thermosetting powder lacquer for covering weld seams in metal containers, especially for foodstuffs or beverages.

The present invention also relates to a new and improved metal container including a weld seam and an interior covering for the weld seam comprising a thermoset powder lacquer on an epoxide resin basis.

The present invention finally relates to a method for covering the surface of a metal container comprising a weld seam with a thermoset lacquer in which method a thermosetting powder lacquer on an epoxide resin basis is applied to the inside of the metal container and subsequently cured at increased temperature.

Thermosetting powder lacquers on an epoxide resin basis as known, for example, from British Patent Publication No. 2,055,843A, serve to cover the entire interior wall of metal containers for receiving foodstuffs or beverages.

SUMMARY OF THE INVENTION

Therefore, with the foregoing in mind it is a primary object of the present invention to provide a thermosetting powder lacquer for covering the weld seams of metal containers, especially for foodstuffs or beverages.

Another and more specific object of the present invention is directed to the provision of a new and improved powder lacquer for internally covering the weld seams in metal containers which fully satisfies the requirements of foodstuff-related legal provisions.

Still a further significant object of the present invention is directed to providing a new and improved thermosetting powder lacquer which is highly reactive and has a high curing rate, yet possesses a sufficiently long shelf-life.

Another, still important object of the present invention is directed to the provision of a new and improved thermosetting powder lacquer which has a sufficiently wide curing window.

Still another important object of the present invention is directed to a new and improved thermosetting powder lacquer which has sufficient flexibility after curing to follow deformations in the container to which the thermoset lacquer is applied.

Now in order to implement these and still further objects of the invention, which will become more readily apparent as the description proceeds, the powder lacquer of the present development is manifested by the features that, the powder lacquer essentially consists of a mixture of at least two aromatic epoxide resins a first component of which contains a maximum of two epoxide groups per molecule on the average and a second component of which contains more than two epoxide groups per molecule on the average, a hardener selected from the group: condensation product of diglycidylether of bisphenol-A and bisphenol-A, an acidic polyester on the basis of trimellitic acid anhydride and an aliphatic polyol, phenolic resin, or a mixture thereof, and a catalyst.

Preferably the epoxide resin mixture contains as the second component an epoxidized novolac resin having an epoxide equivalent weight in the range of 150 to 220 in a proportional amount in the range of of 5 to 15 percent by weight of the aromatic epoxide resin mixture.

A preferred composition of the powder lacquer contains the aromatic epoxide resin mixture in an amount in the range of 72 to 73 percent by weight and the hardener condensation product of diglycidyl ether of bisphenol-A and bisphenol-A in an amount in the range of of 25 to 27 percent by weight of the powder lacquer.

Advantageously the catalyst is selected from the group: imidazole, 2-methyl imidazole, ethyltriphenylphosphoniumchloride or another salt thereof, aluminum acetylacetonate, primary, secondary or tertiary aminophenol, toluene sulfonic acid salt.

The thermosetting powder lacquers composed according to the invention advantageously have a long shelf-life at environmental temperatures and a softening point in the range of 65° C. to 100° C. so that they can be easily prepared by the usual techniques and can be stored unchanged for long periods of time. At softening temperatures below 65° C. there is the danger of agglutination in the lacquer applying system.

The thermosetting powder lacquers according to the invention can be hardened to form a flexible thermoset lacquer at temperatures above 200° C. within very short periods of time, for example in the range of 230° C. to 350° C. within 3 to 20 seconds.

The advantageous properties of the thermosetting powder lacquer and of the thermoset lacquer prepared therefrom by hardening are based thereon, that inter alia, despite the long storage life there are obtained very short hardening periods which enable processing in a continuous passage furnace. The thermoset lacquer is to a wide extent resistant against the action of chemicals and free of odor or taste. The thermoset lacquer also forms a well-adhering, stable and deformable cover which can be sterilized. The weld seam is uniformly and continuously covered particularly at the edges thereof. The thermoset lacquer thus formed not only possesses the required hardness and high impact strength, but also to a specific extent high flexibility so that the cover of the weld seam can follow deformations of the metal container without detachment or crack or fissure formation.

The powder lacquer according to the invention furthermore, if desired, may contain levelling agents, pourability assisting agents, pigments, fillers, thickening agents or mixtures thereof without the advantageous properties of the flexible thermoset lacquer produced therefrom by hardening being detrimentally affected by such additives.

According to the invention the thermosetting powder lacquer having the composition as stated hereinbefore is used to cover weld seams in the interior of metal containers for foodstuffs or beverages. This is made possible because the thermoset lacquer formed from the powder lacquer by hardening constitutes a stable cover which satisfies all presently valid legal regulations with respect to foodstuffs and beverages.

The metal container according to the invention includes an internal cover of the weld seam which is formed by a flexible thermoset lacquer forming a polyaddition product of a mixture of at least two aromatic epoxide resins comprising a first component which contains a maximum of two epoxide groups per molecule on the average and a second component which contains more than two epoxide groups per molecule on the average, a hardener selected from the group: condensation product of diglycidylether of bisphenol-A and bisphenol-A, acidic polyester on the basis of trimellitic acid anhydride and aliphatic polyol, phenolic resin, or a mixture thereof, and a catalyst. Preferably, the thermoset lacquer forms a strip covering the weld seam and overlapping the same on two sides. Advantageously the thermoset lacquer is flexible and deformable conjointly with the metal container.

As alluded to above, the invention is not only concerned with the aforementioned composition aspects, but also relates to a novel method of covering the surface of a metal container comprising a weld seam by a thermoset lacquer. Generally speaking, the inventive method comprises the steps of applying a thermosetting powder lacquer on an epoxide resin basis to the inside of a metal container and subsequently hardening the same at increased temperature.

To achieve the aforementioned measures the inventive method of covering the surface of a metal container comprising a weld seam by a thermoset lacquer, in its more specific aspects, comprises the steps of:

applying a thermosetting powder lacquer to the weld seam;

said thermosetting powder lacquer essentially consisting of:

an aromatic epoxide resin mixture including at least two components a first of which contains a maximum of two epoxide groups per molecule on the average and a second of which contains more than two epoxide groups per molecule on the average;

a hardener selected from the group condensation product of the diglycidylether of bisphenol-A and bisphenol-A, acidic polyester on the basis of trimellitic acid anhydride and aliphatic polyol, phenolic resin, or a mixture thereof;

a catalyst; and heating the metal container with the thermosetting powder lacquer applied to its weld seam to a predetermined hardening temperature for a predetermined hardening time to cure the thermosetting powder lacquer so as to form a thermoset lacquer covering said weld seam.

Preferably, the thermosetting powder lacquer is mixed from its components at a temperature in the range of 65° C. to 100° C., particularly by extruding. Advantageously, the thermosetting powder lacquer thus obtained is applied to the weld seam of the metal container by electrostatic charging, specifically immediately after the welding operation to the still hot weld seam. Preferably the thermosetting powder lacquer is hardened to form a flexible thermoset lacquer by heating to a temperature in the range of 230° C. to 350° C. for a time period of 3 to 20 seconds, preferably in a continuous passage furnace, which, if desired, can be controlled in accordance with a predetermined temperature program.

DETAILED DESCRIPTION OF THE PREFERRED EMBODIMENTS

EXAMPLES 1 to 4

Examples of thermosetting powder lacquers are summarized in the subsequent table. Such thermosetting powder lacquers are composed of the following components:

1. A commercially available aromatic epoxide resin on the basis of epichlorohydrin and bisphenol-A having an epoxide equivalent weight (subsequently designated as "EEW") in the range of 800 to 3,000 and having two epoxide groups per molecule on the average;

2. a commercially available epoxidized novolac resin having an EEW in the range of 150 to 220 and containing about 2.5 epoxide groups per molecule on the average;

3. a hardener forming a condensation product obtained from 100 to 150 parts by weight of the diglycidylether of bisphenol-A and 100 to 200 parts by weight of bisphenol-A and having the following specifications:

equivalent weight with respect to phenolic hydroxyl groups 220 to 280, viscosity at 150° C., 50 to 1,000 mPas, melting range 40° C. to 100° C., and 4. N-dimethylamino phenol as a catalyst.

In the following table the numbers designate parts by weight of the components listed in the table.

| Composition of the Examples of Thermosetting Powder Lacquers | | | | |
|---|---|---|---|---|
| Examples | 1 | 2 | 3 | 4 |
| Epoxide resins EEW 800 | 22,0 | — | 44,0 | 24 |
| Epoxide resins EEW 2,500 | 22,0 | 44,0 | — | 25 |
| Epoxidized novolac resin EEW 180 | 5,0 | 5,0 | 5,0 | — |
| Hardener | 17,5 | 17,5 | 17,5 | 17,5 |
| Catalyst | 0,5 | 0,5 | 0,5 | 0,5 |
| Leveling agent | 0,5 | 0,5 | 0,5 | 0,5 |

The aromatic epoxide resin in the examples 1 to 4 has an EEW in the range of 800 to 3,000; however, aromatic epoxide resins having an EEW in the range of 500 to 20,000 can be used in general.

The epoxide resin mixtures as listed in the preceding table contain epoxidized novolac resin in the amount of 11.4 percent by weight of the epoxide resin mixture. However, powder lacquers can also be used in which the epoxidized novolac resin is contained in less amounts, namely down to 5 percent by weight, and in higher amounts, namely up to 15 percent by weight of the epoxide resin mixture. The proportional amount of the epoxidized novolac resin not only is important for the shelf-life, the hardening temperature and the hardening rate, but also for the properties of the thermoset lacquer obtained on hardening.

Instead of the condensation product formed by the diglycidylether of bisphenol-A and bisphenol-A an acidic polyester formed from trimellitic acid anhydride and an aliphatic diol, triol or the like or a phenolic resin can be employed as a hardener. When the acidic polyester is used as a hardener, the addition of a flexibility-increasing agent like an as far as possible linear terephthalic acid polyester is recommended. Mixtures of such hardeners or curing agents can also be used.

In the formulations as stated in the table the aromatic epoxide resin mixture and the hardener are contained in an amount of 72.6 and 26.0 percent by weight of the powder lacquer, respectively. This composition may be varied within some narrow limits. Thus, generally the same results are obtained when the amount of the aromatic epoxide resin mixture and the amount of the selected hardener is in the range of 72 to 73 and in the range of 25 to 27 percent by weight, respectively.

As a catalyst the formulations as given in the table contain N-dimethylamino phenol in an amount of 0.74 percent by weight. Ethyltriphenylphosphonium salts and also imidazole, 2-methyl imidazole, aluminum acetylacetonate, other, also primary or secondary aminophenols or a toluene sulfonic acid salt may be employed as a catalyst. Generally, the proportional amount of the catalyst in the powder lacquer will not exceed 1.5 percent by weight of the powder lacquer.

The thermosetting powder resins as described hereinbefore have a long shelf-life and thus can be stored without any chemical change for relatively long periods of time without their efficacy being impaired thereby.

Thermosetting powder resins which are composed in accordance with the formulations as given in the table have a softening point at a temperature in the range of 65° C. to 100° C. Therefore, such powder lacquers are in powderous form and free from agglutinations or agglomerations at the usual environmental and processing temperatures. On the other hand, the powder lacquers can be produced and processed in a temperature range which is readily accessible by the usual techniques. For example, the powder lacquers as stated are obtained by thoroughly mixing their components by means of an extruder in the temperature range of 90° C. to 100° C., the mixture is then cooled, ground and screened.

For the further processing of the thermosetting powder lacquer, particularly for the uniform distribution over the weld seam of the thermoset lacquer formed by the consecutive hardening operation and for the uniform covering of the edges of the weld seam, it has proven advantageous to temper the powder lacquer after the extrusion but prior to grinding at a temperature in the range of 50° C. to 100° C. for a period of time which may encompass one hour to several days. Favorable for further processing is also the addition of a commercially available leveling agent. Such leveling agents usually and predominantly comprise polyacrylic acid esters.

The thermosetting powder lacquer as described hereinbefore in the examples 1 to 4 is advantageously applied to the weld seam of the related metal container by electrostatic charging. It is favorable therefor that the powder lacquer can be applied to the still hot weld seam immediately after the welding operation without the distribution of the thermoset lacquer over the weld seam and its properties being negatively affected thereby.

The metal container with the weld seam which has been provided with the thermosetting powder lacquer in the manner as described hereinbefore, is subsequently subjected to a heat treatment. During such heat treatment the thermosetting powder lacquer is transformed into a thermoset lacquer. The heat treatment can be conducted in different manners. In the technical operation it has proven advantageous to convey the metal containers comprising the weld seam cover through a continuous passage furnace in which the powder lacquer which covers the weld seam is rapidly heated to temperatures at or above 200° C. and cured to form a flexible thermoset lacquer.

The hardening of the thermosetting powder lacquer can be conducted at different conditions depending on the related requirements. It will have to be considered therefor that relatively low hardening temperatures require relatively longer hardening periods. It has been found in practice that at hardening temperatures in the range of 230° C. to 350° C. complete hardening or curing of the thermosetting powder lacquer is achieved within a period of 20 to 3 seconds. The continuous passage furnace either can be operated at a constant temperature or may have a temperature profile which is adjusted in accordance with the momentary requirements.

Experiments which are not reproduced here in detail have shown that the previously described thermosetting powder laquers show hardening behavior which is distinguished by a very wide curing window. Accordingly there exists a relatively wide temperature range within which the intended advantageous hardening or curing is not impaired by side reactions like super-hardening or thermal decomposition. This is of particular significance since in the technical operation of a continuous passage furnace the hardening temperatures and the hardening periods cannot be maintained with the precision which would be required, for example, in the case of a thermosetting powder lacquer having a narrow curing window.

Furthermore, it has been shown that without any impairment to the desired properties of the thermoset lacquer further additives may be admixed to the thermosetting powder lacquer to some extent like, for example and in addition to the aforementioned leveling agents, also pourability assisting agents, pigments, fillers, thickening agents or mixtures thereof. However, the filler which mostly comprises an inorganic material should not exceed a proportional amount of 30 percent by weight of the powder lacquer.

After hardening or curing the thermoset lacquer forms a strip which covers the weld seam of the metal container and which overlaps the weld seam on both sides. The powder lacquer having the formulations as stated in the preceding table hardens or cures to form a thermoset lacquer which not only possesses the necessary impact strength but additionally is flexible to a sufficient degree so that metal containers provided with such a weld seam cover can be readily further deformed, for example, by beading without thereby detaching, tearing or damaging in any other way the thermoset lacquer. The thermoset lacquer thus obtained also has a high resistance against the action of chemical agents which is sufficient for many purposes of use and which satisfies any food-related legal provisions presently existing in most countries.

For investigating in more detail the properties of the thermoset lacquer which is obtained from the powder lacquers as mentioned hereinbefore, the properties of the thermoset lacquer have been investigated after hardening at a hardening temperature of 280° C. as a function of the hardening time. For this purpose the powder lacquers were applied to tin-plated sheet metal of the type E 2.8/2.8 T3 and having a thickness of 0.23 mm. The test sheet was then heated in a laboratory baking furnace at 280° C. In the following table the heating periods are given in seconds. In this table the data "Example 1, 2, 3, 4" relate to the thermosetting powder lacquers having the compositions as given in the table further hereinbefore.

| Properties of Thermoset Lacquers Prepared from Examples 1 to 4 in the Acetone Rub and Impact Strength Test | | | | | |
| --- | --- | --- | --- | --- | --- |
| Hardening Time at 280° C. in seconds: | 20 | 30 | 40 | 50 | 60 |
| Acetone test | | | | | |
| Example 1 | 10 | 100 | >100 | >100 | >100 |
| Example 2 | 25 | 100 | >100 | >100 | >100 |
| Example 3 | 10 | 100 | >100 | >100 | >100 |
| Example 4 | 10 | 20 | 80 | >100 | >100 |
| Impact Resistance (Nm) | | | | | |
| Example 1 | | 4 | 60 | 76 | 80 | 80 |

-continued

Properties of Thermoset Lacquers Prepared from Examples 1 to 4 in the Acetone Rub and Impact Strength Test

| Hardening Time at 280° C. in seconds: | 20 | 30 | 40 | 50 | 60 |
|---|---|---|---|---|---|
| Example 2 | 4 | 24 | 64 | 80 | 80 |
| Example 3 | 4 | 25 | 50 | 80 | 80 |
| Example 4 | 4 | 25 | 50 | 80 | 80 |

The acetone test referred to in the table is the acetone rub test which is based on a widely used and applied method. Accordingly, a cotton plug is soaked with acetone and the acetone-soaked cotton plug is manually moved back-and-forth over the location to be investigated without the application of pressure. The number of back-and-forth movements or double strokes is counted which is required to scrub away or through a given layer. In the table the numbers given under the heading "Acetone test" designate the number of such back-and-forth movements.

The further tests in the table under the heading "Impact Strength" have been performed with a ball impacting tester, Model 304, by the company Erichsen GmbH & Co. KG, 5870 Hemer-Sundwig, Federal Republic of Germany. Such examination satisfies ASTM Specifications G13 and G27. In this test a given ball pin is dropped from different and adjustable dropping heights on the test sheet which is arranged in such a way that the ball pin drops on that side thereof which is remote from the coated weld seam. The values given in the table are energy values in Nm at which the thermoset lacquer breaks or detaches from the weld seam. The test sheet E 2.8/2.8 T3 having a thickness of 0.23 mm as mentioned hereinbefore breaks at an energy value in the range of 70 to 90 Nm. Such a value for the impact strength in the table thus signifies that the cover of the thermoset lacquer remained unchanged until the breaking of the test sheet.

The example 4 in the aforementioned Tables relates to a thermoset lacquer obtained without the addition of epoxidized novolac resin. As will be recognized in the Table on page 18, such product has poor qualities at least in respect of the acetone rub test. This is additionally confirmed by further investigations, particularly in a sterilization test (1 hour at 121° C.) in which the product obtained in the absence of epoxidized novolac resin yields significantly poorer results.

The result is thus that the thermosetting powder lacquers prepared in accordance with the given formulations are cured to form a thermoset lacquer which has a high chemical and mechanical strength. The thermoset lacquer, in addition, satisfies the presently valid food-related legal provisions so that the thermosetting powder lacquer as described hereinbefore can be used in metal containers for foodstuffs or beverages. Furthermore, the thermosetting powder lacquers have excellent processing properties. Despite their high reactivity which enables hardening within a few seconds, the powder lacquers as described herein are stable without chemical changes at environmental temperatures over long times. They can also be prepared and processed without the danger of chemical changes at temperatures up to 100° C. by mixing from their components. It is also a specific advantage of such powder lacquers that they have a relatively very wide curing window so that the properties of the thermoset lacquer obtained therefrom are widely independent of accidental changes in the hardening temperature or in the hardening period of time.

While there are shown and described present preferred embodiments of the invention, it is to be distinctly understood that the invention is not limited thereto, but may be otherwise variously embodied and practiced within the scope of the following claims.

Accordingly, what we claim is:

1. A thermosetting powder lacquer on an epoxide resin basis essentially consisting of:
    a mixture of polymeric aromatic epoxide resins comprising at least two components a first of which contains a maximum of two epoxide groups per molecule on the average and a second of which contains more than two epoxide groups per molecule on the average;
    a hardener selected from the group consisting of: (i) condensation product of diglycidylether of bisphenol-A and bisphenol-A; (ii) polyester made of trimellitic acid anhydride and aliphatic polyol and containing free carboxylic acid groups; (iii) phenolic resin; or (iv) a mixture thereof; and
    a catalyst.

2. The powder lacquer as defined in claim 1, wherein:
    said first component of said aromatic epoxide resin mixture has an epoxide equivalent weight in the range of 500 to 20,000.

3. The powder lacquer as defined in claim 2, wherein:
    said first component of said aromatic epoxide resin mixture has an epoxide equivalent weight in the range of 800 to 3,000.

4. The powder lacquer as defined in claim 1, wherein:
    said second component of said aromatic epoxide resin mixture comprises an epoxidized novolac resin having an epoxide equivalent weight in the range of 150 to 220.

5. The powder lacquer as defined in claim 4, wherein:
    said epoxidized novolac resin is present in an amount in the range of 5 to 15 percent by weight of the aromatic epoxide resin mixture.

6. The powder lacquer as defined in claim 1, wherein:
    said hardener prepared as a condensation product of the diglycidylether of bisphenol-A and bisphenol-A is formed from the diglycidylether of bisphenol-A and bisphenol-A in a weight ratio having a value in the range of 0.5 to less than 1.5.

7. The powder lacquer as defined in claim 6, wherein:
    said hardener forming a condensation product of the diglycidylether of bisphenol-A and bisphenol-A in a weight ratio in the range of 0.5 to 1.5 has an equivalent weight in the range of 220 to 280 with respect to phenolic hydroxyl groups, a viscosity in the range of 50 to 1,000 mPas at a temperature of 150° C. and a melting range of 40° C. to 100° C.

8. The powder lacquer as defined in claim 6, wherein:
    said aromatic epoxide resin mixture and the condensation product forming the hardener are present in an amount in the range of 72 to 73 and in the range of 25 to 27 percent by weight, respectively, of the powder lacquer.

9. The powder lacquer as defined in claim 1, wherein:
    said catalyst is selected from the group: imidazole, 2-methyl imidazole, ethyltriphenylphosphoniumchloride or another salt thereof, aluminum acetylacetonate, primary, secondary or tertiary aminophenol, toluene sulfonic acid salt.

10. The powder lacquer as defined in claim 1, wherein:

said powder lacquer has a softening point in the range of 65° C. to 100° C.

11. The powder lacquer as defined in claim 1, wherein:

said powder lacquer has a long shelf-life at environmental temperature.

12. The powder lacquer as defined in claim 1, wherein:

said powder lacquer is curable at temperatures at or above 200° C. in a very short period of time to form a flexible thermoset lacquer.

13. The powder lacquer as defined in claim 12, wherein:

said powder lacquer is curable at a temperature in the range of 230° C. to 350° C. to form a flexible thermoset lacquer.

14. The powder lacquer as defined in claim 12, wherein:

said powder lacquer is curable in a time period in the range of 3 to 20 seconds to form a flexible thermoset lacquer.

15. The powder lacquer as defined in claim 1, wherein:

said powder lacquer has a wide curing window.

16. The powder lacquer as defined in claim 1, wherein:

said powder lacquer contains an additive selected from the group: leveling agent, pourability assisting agent, pigment, filler, thickening agent, or a mixture thereof.

17. The powder lacquer as defined in claim 16, wherein:

said filler is present in a maximum amount of 30 percent by weight of the powder lacquer.

* * * * *